Nov. 16, 1965  N. WEBER  3,218,220
STRENGTHENED GLASS ARTICLE AND METHOD OF PRODUCING SAME
Filed Nov. 20, 1964  2 Sheets-Sheet 1

*INVENTOR*
NEILL WEBER

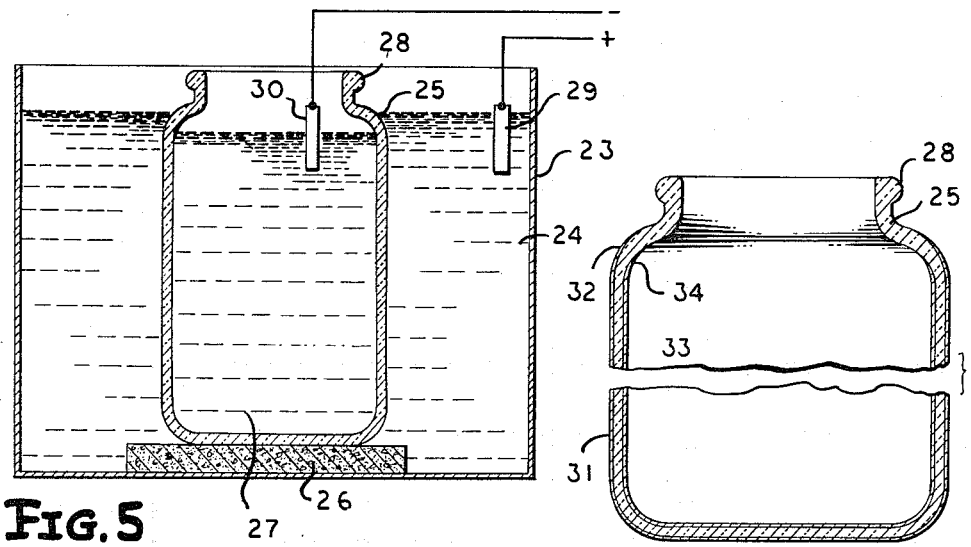
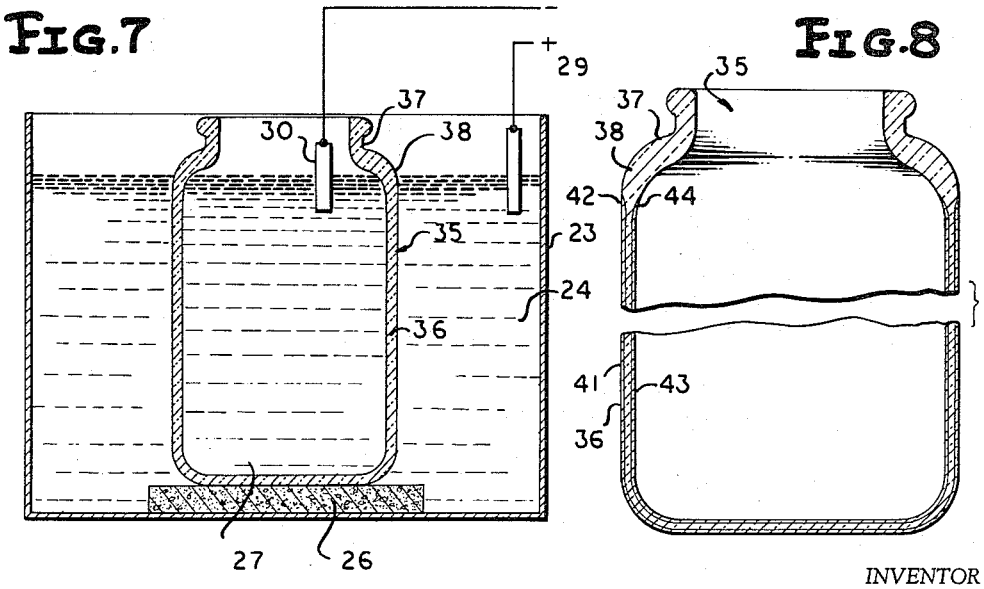

3,218,220
STRENGTHENED GLASS ARTICLE AND
METHOD OF PRODUCING SAME
Neill Weber, Dearborn, Mich., assignor, by mesne assignments, to Brockway Glass Company, Inc., Brockway, Pa., a corporation of New York
Filed Nov. 20, 1964, Ser. No. 412,658
20 Claims. (Cl. 161—1)

This application is a continuation-in-part of my application Serial No. 13,777, filed March 9, 1960, now abandoned.

This invention relates to new and useful improvements in the glass art, and more particularly relates to a novel method of tempering glass articles formed of soda glass.

Practically all fractures in glass originate at a surface, and the single most important parameter relating to fracture is the stress field in which possible fracture origins or flaws are bathed. If the surface of an article, subjected to no external forces, is in a state of balanced compression, the average breaking strength of the article is greater than that of a similar, but initially stress-free article, by an amount nearly equal to the compressive stress in the surface. It is upon this fact that the present invention is based.

At least two methods for producing balanced compression in a glass surface have been commercially exploited. In the first of these, a thermal gradient is maintained between the interior and exterior of a glass article as the whole article is allowed to cool through the strain temperature. In the other method, the chemical composition of the surface is altered at a temperature above the strain temperature to form a layer of glass having a smaller coefficient of expansion than the interior glass, so that cooling of the glass through the strain point has the effect of putting the surface into compression and the interior in tension.

The method of this application makes use of the principle that, under certain conditions, a compressive stress in the surface of a glass article can be produced by altering the chemical composition of the surface layer so as to form a glass having a greater molar volume in the unconstrained state than the base glass to which it is attached.

In considering the present invention, it is pointed out that if the result of some process is to increase the equilibrium (unconstrained) molar volume of a part of a glass article, then the final state of the article depends on the relationship between the temperature at which the process is carried out and the strain temperatures of the glasses constituting the modified or unmodified portions of the article. If the modified glass is a surface layer, and if the temperature of the network expanding process is below the strain temperature of either glassy portion, the expansion of the surface layer in the planes parallel to the surface is restricted by reason of its attachment to the base glass through the original network bonds in the region between the modified surface layer and the base glass. Thus, the article will be in a state of balanced stress, the surface in compression and the base glass in tension. On the other hand, if the temperature of the process is above the strain point of either the original or modified glasses, volume changes are accommodated through viscous flow instead of elastic deformation, and a state of balanced stress cannot be achieved.

It is, therefore, the primary object of the invention to provide a novel method of altering the chemical composition of a surface layer of glass to form a glass having a greater molar volume in the unconstrained state than the base glass to which it is attached, and the method being of a nature that it is carried out at a temperature below the strain temperature of the glass so that the volume changes are accomplished through an elastic deformation of the bond network of the glass.

Another object of the invention is to provide a novel method of exchanging potassium ions for sodium ions in the surface layer of a soda glass article, with the exchange taking place below the strain temperature of the glass, and sufficiently rapidly so as to be commercially feasible.

Another object of the invention is to provide a novel electrochemical process for migrating potassium ions into a surface of a soda glass article with the potassium ions replacing sodium ions of the original glass, the process including the steps of immersing the surface of the glass article wherein the ion transfer is to take place in a molten potassium salt, the potassium salt being an electrolyte and containing an electrode connected to a D.C. voltage source, there being another electrode or electrolyte containing an electrode in contact with the opposite surface of the glass and connected to the cathode of the D.C. voltage supply with the D.C. current passing through the glass so as to increase the rate of migration of the potassium ions into the surface of the soda glass.

A further object of the invention is to provide a novel apparatus for rapidly migrating potassium ions into surface layers of soda glass, the apparatus including an electrolyte composed at least in part of molten potassium salts in contact with the surfaces of the glass which is to be tempered, and an electrode or an electrolyte in combination with an electrode in contact with the opposite surface, and the electrodes being connected to a source of D.C. voltage having means for controlling the flow of current through the glass so that the temperature of a glass is maintained below the strain temperature of the glass at all times during the migration of the potassium ions into the glass.

Still another object of the invention is to provide a tempered glass article formed of soda glass, the glass article having at least one surface layer thereof under compression, the compression in the glass having been accomplished by the replacement of sodium ions in the surface layer by potassium ions, the potassium ions being larger than the sodium ions, and the transfer having taken place while the temperature of the glass remains below the strain temperature of the glass.

Yet another object of the invention is to provide a novel method of tempering opposite surfaces of a soda glass by replacing sodium ions in the surface layers by potassium ions, the process including the steps of first replacing sodium ions in one surface layer by potassium ions to a depth twice that desired, and then replacing sodium ions by potassium ions in the opposite surface of the glass article to the desired thickness, with the result that sodium ions migrating from the last-mentioned surface will result in the replacement of the innermost half of the first-mentioned potassium ions and the outermost potassium ions will migrate out of the first-mentioned glass surface layer, thereby resulting in a soda glass article having the opposite surface layers thereof under compression due to the replacement of sodium ions by larger potassium ions, all of the ion transfer having taken place at a temperature below the strain temperature of the glass.

A further object of this invention is to so control the flow of current through the glass wherein there is a gradual diminishing of current flow outwardly of the area being tempered so that the layer wherein the replacement of the sodium ions by potassium ions has taken place gradually diminishes in thickness outwardly towards the edge thereof, thereby preventing any undue stressing of the normal soda glass and thus preventing cracking thereof.

It has been found that the above set forth object may be accomplished in two simple manners, although it is within the realm of this invention to utilize other methods of accomplishing this gradual diminishing of the replaced layer. The first method is by varying the contact of the electrolyte on opposite surfaces of the glass so that there is a spreading of the current as it flows from one electrolyte to the other, thereby diminishing current flow around the edges of the treated area. The other method requires an increase in the thickness of the glass, which increase in glass thickness results in a greater resistance to current flow and therefore, provides for a diminishing of current flow around the edges of the glass area being treated.

With the above, and other objects in view that will hereinafter appear, the nature of the invention will be more clearly understood by reference to the following detailed description, the appended claims, and the several views illustrated in the accompanying drawings.

In the drawings:

FIGURE 5 is a schematic sectional view through a tank showing a glass container, such as a bottle, having the surfaces thereof tempered in accordance with this invention.

FIGURE 6 is a vertical sectional view taken through the bottle of FIGURE 5 on an enlarged scale with an intermediate portion thereof being broken away and shows the specific manner in which the bottle has been surface tempered.

FIGURE 7 is a schematic sectional view similar to FIGURE 5 and shows another method of obtaining the desired surface tempering of bottles, the bottle having a thickened neck portion to automatically provide for a diminishing current flow along the edge of the portion of the bottle being tempered.

FIGURE 8 is an enlarged vertical sectional view taken through the bottle of FIGURE 7 after the tempering thereof and shows the specific details of the bottle, an intermediate portion of the bottle being broken away.

The invention particularly relates to the tempering of soda glass, or more specifically soda-lime-silica glass. In accordance with the invention, it is proposed to alter the chemical composition of one or more surface layers of the glass to form a glass having a greater molar volume in the unconstrained state than the base glass to which it is attached. This is accomplished by migrating potassium ions into the surface layer of the glass, with the potassium ions replacing sodium ions, and the transfer of ions taking place below the strain temperature of the glass so that the larger potassium ions will result in a volume change in the surface layer of the glass through elastic deformation of the network bond, and the surface layer of the glass will be placed in compression.

The rate of exchange of potassium ions for sodium ions by ordinary diffusion at temperatures below the strain point of the soda glass, such as takes place when a soda glass article is immersed in a molten potassium salt, is impractically slow. On the other hand, it has been found that the rate of migration of potassium ions into the soda glass can be vastly increased if the diffusion is biased by an electric field in the proper direction. It has also been found that the current flow is critical and must be controlled, since an excess flow of current will result in the rapid heating of the glass to a temperature above the strain temperature thereof, in which event the potassium ions are accommodated within the network bond by a viscous flow of the network bond, thereby completely defeating the attempt to place the surface layer of the glass in compression.

Figure 1:
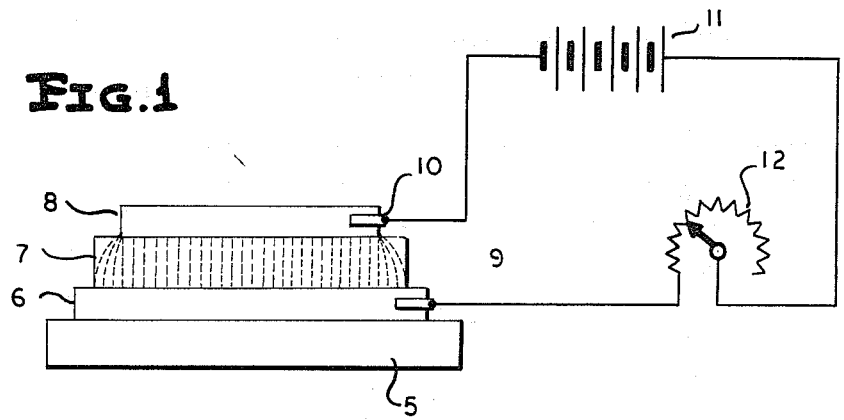
FIGURE 1 is a schematic view showing a flat article of glass in the process of being tempered by the migration of potassium ions into a surface layer thereof.

An example apparatus for carrying out the desired process is illustrated in FIGURE 1. The apparatus includes a heated plate 5 which may be heated in any desired manner, provided that the temperature of the plate may be controlled. Overlying the heated plate 5 is a pad 6 which is preferably in the form of a glass fiber filter pad which is soaked in a molten potassium salt, such as $KNO_3$. The glass article to be tempered is referred to by the numeral 7, and rests upon the pad 6. Another pad 8, which also may be in the form of a glass fiber filter pad, overlies the glass article 7. Like the pad 6, the pad 8 is soaked in a low melting salt, such as $KNO_3$.

Suitable inert electrodes 9 and 10, disposed within the pads 6 and 8, respectively, and within the molten potassium salt therein are connected to an electrical source 11 which in the example apparatus is a 600 v.–300 ma. D.C. voltage source. The electrodes 9 and 10 are preferably formed of platinum, although other electrode materials such as dense graphite rods may suffice. The electrode 9 is connected to the electrical source 11 so as to be the anode. The electrode 10 serves as the cathode. The electrical system also includes a suitable control device 12, which has been illustrated as being a rheostat, although other control devices may suffice. The purpose of the control device 12 is to control the current flow through the glass article.

As stated above, it is necessary that the hot plate 5 be of the type wherein the temperature thereof may be controlled. In tests conducted, the molten potassium salt, which functions as an electrolyte, within the pad 6 is heated so that the temperature of the glass article 7 near the surface in contact with the electrolyte is maintained at 350 degrees C. ±10 degrees C.

Experience has shown that careful control of the current density is essential to the success of the process. Maintaining the proper current density is important for two reasons. These include the fact that the current density (together with the average operating surface temperature of the glass) must be low enough so that the electrical energy dissipated in the glass does not cause the temperature of any portion of the glass to rise above the strain temperature of the glass. Since the electrical resistivity of the layer of the glass containing potassium ions is larger than the sensitivity of the soda glass at temperatures below the strain temperature, in many cases only the heat generated in the surface layer need be considered. Experimentally, it is fairly easy to observe when the current density is too high. If for a given depth of penetration of potassium ions the voltage is slowly increased from zero through low values, the current increases in roughly the same proportion according to Ohm's law. When the voltage exceeds a certain value, but is held constant, the current continues to rise, finally leveling off at a high value corresponding to a much smaller sample resistance than was inferred from the low voltage current values. The rapid current rise at constant voltage indicates that the glass network surrounding the potassium ions has relaxed and that the temper is lost. If such a sample is subsequently cooled, the surface will actually be in tension because of the high expansivity of the annealed potassium glass.

The second reason for maintaining the proper current density is so that the gradient of the depth of penetration of the potassium ions in going from a tempered to an untempered zone is not too steep, otherwise, excessive tensional stress in the boundary zone will be produced. It is to be noted that the pad 8 is of a lesser outline than the glass article 7. At the same time, the pad 6 is of an outline at least equal to or greater than the glass article 7. In FIGURE 1 there is shown current flow through the glass article 7 by means of dotted lines. It is to be noted that where the pad 8 directly overlies the pad 6, there is relatively constant current flow. On the other hand, at the edge of the pad 8 there is a brooming of the current with the result that there is a gradual decrease in current flow in the outer edge portion of the glass article 7. By properly controlling the relationship of the pads 6 and 8, it will be seen that the rate of ion transfer decreases in the outer boundary portion of the glass article 7. It is desired that the relationship of the pads 6 and 8 be such that the ion transfer at the extreme edge of the glass article 7 be zero.

Figure 2:
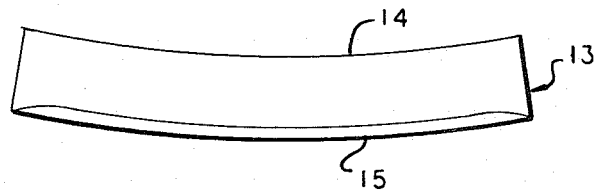
FIGURE 2 is an enlarged schematic view of a glass article having one surface layer only thereof tempered by the replacement of sodium ions thereof by potassium ions.

Reference is now made to FIGURE 2 in particular, wherein a glass disk is illustrated, after being tempered on one surface only. The glass disk is referred to by the numeral 13, and includes a zone of base glass 14 and a zone of tempered glass 15. The glass in the tempered zone 15 is under compression, whereas the glass in the base zone 14 is under tension. The compressive forces within the tempered zone or layer 15 result in a slight curvature in the plate or disk. It is to be noted that the zone tempered glass 15 gradually diminishes in thickness along the outer edge thereof so that the thickness of the zone tempered glass 15 is zero at the outer edge of the glass article 13.

Figure 3:
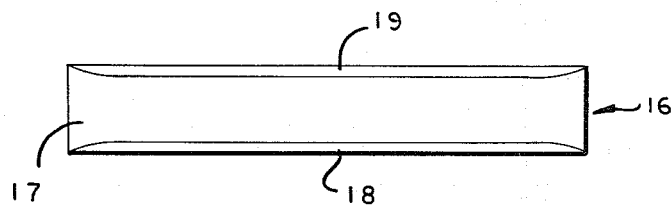
FIGURE 3 is a schematic view similar to FIGURE 2, of a glass article having opposite surfaces thereof tempered by the replacement of sodium ions thereof by potassium ions.

In FIGURE 3, there is illustrated a disk or plate of soda glass, generally referred to by the numeral 16. The glass disk 16 includes a central zone 17 of base glass, and upper and lower zones 18 and 19 of tempered glass. The glass in the zones 18 and 19 is under compression, whereas the zone 17 of base glass is under tension. However, when the zones 18 and 19 are of equal thickness, the compressive forces on opposite sides of the base zone 17 balance each other, and the glass plate 16 remains flat. It is to be noted that the edge of each of the layers 18 and 19 diminishes outwardly in thickness so that the thickness of each layer 18 and 19 at the boundary thereof is zero.

Utilizing the apparatus of FIGURE 1, to temper a glass article, such as the glass article 7, potassium ions migrate through the surface of the glass article displacing sodium ions which pass into the electrolyte carried by the pads 8. The boundary between the potassium-bearing glass and the original glass will be sharp because of the large difference in the average mobilities of these ions in the glass network. A certain, normally small, fraction of the sodium ions whose mobility is smaller than that of the potassium ions will not be displaced, and thus, the percent replacement will not be 100 percent.

There is a way of varying the effective replacement of the sodium ions with potassium ions, and hence the degree of temper of the glass. If some sodium ions are present in the electrolyte within the pad 6, both the potassium ions and the sodium ions will migrate into the glass when current is passed through the cell formed of the electrolytes within the pads 6 and 8 and the glass article 7.

Since the cations migrate through the glass from the anodyte to the catholyte or cathode, when it is desired to temper opposite surfaces of a glass article, it is necessary that a first surface of the glass article be tempered to a depth equal to twice the depth desired. Then, the current flow is reversed, with the result that the sodium ions in the opposite surface from that first tempered are replaced by potassium ions. As the sodium ions migrate through the glass, they will replace the innermost potassium ions and as the potassium ions flow outwardly, they will pass into the electrolyte in engagement with the first tempered surface of the glass article. Thus, the finally tempered glass article will have two tempered surface layers of substantially the same thickness.

At this time, it is pointed out that the maximum improvement in strength of the glass article is realized when the compression layer or tempered layer penetrates below the deepest crack or stress concentrator in the original article.

Figure 4:
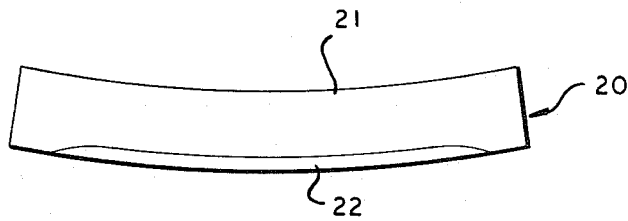
FIGURE 4 is an enlarged schematic view similar to FIGURE 2 and shows only a portion of the surface of the glass having been tempered.

Referring now to FIGURE 4, it will be seen that there is illustrated a glass article which is similar to the glass article 13 and which is generally referred to by the numeral 20. The glass article 20 differs from the glass article 13 only in that the portion of the base glass 21 thereof which has been tempered is of a reduced outline as compared to the tempered layer 15, the tempered layer of the glass article 20 being referred to by the numeral 22. It is also to be noted that the peripheral edge portion of the tempered glass layer diminishes in thickness to zero. The point of zero thickness of the layer 22 is spaced inwardly from the periphery of the glass article 20 and thereby the possibility of unduly stressing the base glass 21 through the tempering process is entirely eliminated.

Experiments have been made utilizing the apparatus schematically illustrated in FIGURE 1. The experiments were made on circular disks cut from double strength American Window Glass Company window glass, which is a soda-lime-silica glass. The glass disks were edge ground, and had a diameter of 69 mm. and a thickness of 2.31 mm. The disks, when tested, were simple, supported on an O-ring at the edge and broken by applying uniform hydrostatic pressure through water in contact with the surface. The hydrostatic pressure to break untreated samples averaged 45.3 p.s.i., with the average maximum tensile stress at the center of the sample being 12,000 p.s.i. Data obtained in example tests are listed below:

(1) The glass disk was tempered on one side only, with the electrolyte being formed of 30 parts by weight of $KNO_3$ to one part $NaNO_2$; the average temperature of the surface being tempered is maintained at 350 degrees C.; the current was 40 ma.; and the time of treatment was 40 minutes. The hydrostatic pressure required to break this sample was 114 p.s.i., the origin of the fracture was in the tempered zone, and the maximum tensile stress at the center of the sample was 30,800 p.s.i.

(2) The sample was treated on one side only, and the composition of the electrolyte in the pad 6 was 12 parts by weight of $KNO_3$ to one part by weight $NaNO_2$; the average temperature of the treated surface was 350 degrees C.; the current was 40 ma.; and the time of treatment was 40 minutes. The hydrostatic pressure required to break the tempered sample was 130 p.s.i., with the origin of the fracture being in the edge of the sample, and the maximum tensile stress at the center being 34,900 p.s.i.

(3) The sample was treated on only one side, with the electrolyte within the pad 6 being $KNO_3$; the average temperature maintained in the treated surface was 350 degrees C.; the current was 40 ma.; and the time of treatment, 60 minutes. The hydrostatic pressure required to break the treated sample was 340 p.s.i., with the origin of fracture being in the edge, and the maximum tensile stress at the center was 77,000 p.s.i.

Referring now to FIGURES 5 and 6 in particular, it will be seen that there is illustrated a manner in which a glass bottle or similar glass container may be tempered in accordance with this invention. In accordance with this invention, a tank 23 is provided in which an electrolyte 24 is placed. A glass bottle 25 to be tempered is positioned within the tank 23 and may be seated on a suitable porous pad 26. A second electrolyte 27 is placed within the bottle 25. It is to be noted that the height of the electrolyte 24 is such that it extends substantially up to the neck ring 28 of the bottle whereas the electrolye 27 is of a lesser height than the electrolyte 24. Thus, the electrolyte 27 corresponds to the electrolyte carried by the pad 8 while the electrolyte 24 corresponds to the electrolyte carried by the pad 6.

Suitable electrodes 29 and 30, which correspond to the electrodes 9 and 10, are positioned within the electrolytes 24 and 27. The electrodes 29 and 30 will be connected to a source of electrical energy in the same manner as that shown in FIGURE 1. It is also to be understood that the electrolyes 24 and 27 will correspond to those carried by the pads 6 and 8.

In view of the fact that the electrolyte 24 extends above the electrolyte 27, it will be seen that while there will be a direct current flow through a major portion of the body of the bottle 25, there will be a brooming of the current in the neck or shoulder area of the bottle 25 so that there will be a gradual diminishing of current flow in the neck and shoulder portion of the bottle with a resultant diminishing ion transfer. Thus, when the tempering of the bottle 25 is completed, it will be seen that it will have an outer layer of tempered glass which is referred to by the numeral 31 and that this outer layer will gradually diminish thickness towards the neck portion of the bottle, as at 32. When desired, the inner surface of the bottle 25 may also be tempered so as to have an inner tempered layer 33 which has an upper edge portion 34 of diminishing thickness. Inasmuch as the tempered layer or layers of the bottle 25 diminish gradually to a zero thickness, it will be seen that the base glass of the bottle 25 is not unduly stressed and there is no problem of undesired cracking of the base glass above the tempered zone of the bottle.

In FIGURE 7 there is illustrated the same general apparatus as that shown in FIGURE 5, the apparatus including the tank 23, outer electrolyte 24, a pad 26 and inner electrolyte 27. However, there is illustrated a modified form of bottle which is referred to by the numeral 35. The bottle 35 has a body portion 36 which is of a substantially constant thickness. However, it is to be noted that the thickness of the bottle 35 increases so as to have a neck portion 37 of a much greater thickness than the thickness of the body 36. Connecting the relatively thick neck portion 37 to the relatively thin body portion 36 is an intermediate shoulder portion 38 which is a gradually increased thickness from the body 36 to the neck portion 37.

It is to be noted that the heights of the electrolytes 24 and 27 are substantially the same. However, when current is passed through the bottle 35 by the flow of current through the electrolytes 24 and 27 through the electrodes 29 submerged therein, it will be seen that the flow of current through the body 36 will be much greater than that through the neck portion 37. Furthermore, the flow of current through the intermediate portion 38 will gradually diminish from the juncture of the intermediate portion 38 with the body 36 towards the juncture of the intermediate portion 38 with the neck portion 37.

It will be readily apparent from FIGURE 8 that in the completed bottle 35, the body 36 will have an outer tempered layer 41 which diminishes in thickness as at 42 in the intermediate portion 38 of the bottle. Also, if it is so desired, the inner surface of the bottle 35 may be tempered so as to have an inner tempered layer 43 which diminishes in thickness as at 34 in the intermediate portion of the bottle.

Although only two specific ways of controlling the current flow along the edge portions of the surface to be tempered have been specifically illustrated and described here, it is to be understood that other manners of varying the current flow may be readily devised in accordance with this invention.

The advantages of glass tempered by the foregoing process are numerous. These include (1) the amount of compression that can be introduced into the surface appears to be greater than the amount produced by any prior art process. (2) The compression in the surface layer is uniform throughout, and thus the layer need only be as thick as the depth of the deepest crack or flaw in the pre-temeperd article with the result that the strain energy in an article for a given performance strength is smaller than, for example, in a thermally tempered article. (3) Since the diffusion of potassium ions through the silicon-oxygen network is much slower than the diffusion of sodium ions in the same glass network, the chemical durability of a tempered article should be greater than that of an untreated article, assuming that deterioration is at least partly determined by the rate of alkali ion diffusion.

From the foregoing, it will be seen that novel and advantageous provision has been made for carrying out the desired end. However, attention is again directed to the fact that variations may be made in the example method and apparatus disclosed herein without departing from the spirit and scope of the invention, as defined in the appended claims.

I claim:

1. A method of tempering soda glass comprising the steps replacing sodium ions in a surface layer of the glass by potassium ions and retaining the glass below the strain temperature thereof to place the surface in compression with the replacement of the sodium ions diminishing along edges of the portion of the glass wherein the replacement of the sodium ions has taken place to prevent undue stressing of the glass and the cracking thereof.

2. A method of tempering a soda glass member wherein the member has a thin wall portion joined to a thickened wall portion by an intermediate wall portion comprising the steps of applying an electrolyte containing displaceable potassium ions to a surface of the thin wall portion and at least part of the intermediate wall portion, passing current through the glass from the electrolyte and replacing sodium ions in a layer of the glass at the surface by potassium ions while maintaining the temperature of the glass below the strain temperature thereof to place the surface in compression with the current flow through the intermediate wall portion being less than that through the thin wall portion due to the greater electrical resistance of increased wall thickness of the intermediate wall portion as compared to the electrical resistance of the thin wall portion, and the thickness of the layer diminishing in the intermediate wall portion.

3. A method of tempering a soda glass member comprising the steps of applying a first electrolyte containing displaceable potassium ions to an area of first surface of the glass, applying a second electrolyte to an area of a second surface of the glass in generally opposed alignment with the first area contacted by said first electrolyte, the area of said second surface contacted by said second electrolyte being less than said first area, passing current through the glass from the first electrolyte to the second electrolyte and replacing sodium ions in a layer of the first surface area with potassium ions while maintaining the temperature of the glass below the strain temperature to place the first surface in compression and with the current flow between fringe portions of said electrolytes gradually diminishing outwardly due to the greater electrical resistance resulting from the gradually increasing length of the flow path of the current and with the thickness of the layer likewise diminishing outwardly.

4. A tempered soda glass article having at least one surface layer thereof under compression, at least certain of the sodium ions in the surface layer having been replaced by potassium ions, the layer of displaced ions having a peripheral portion of outwardly diminishing thickness to prevent undue boundary stressing and cracking of the glass.

5. A method of tempering soda glass comprising replacing sodium ions in a surface layer of the glass by potassium ions by contacting the glass with a molten potassium salt while retaining the glass below the strain temperature thereof to place the surface in compression.

6. A method of tempering soda glass comprising replacing sodium ions in a surface layer of the glass by potassium ions through an electrochemical process by contacting the glass with a molten potassium salt while retaining the glass below the strain temperature thereof to place the surface in compression.

7. A method of tempering soda glass comprising the steps of applying an electrolyte containing potassium ions to a surface of the glass and passing electric current through the glass and the electrolyte to replace the sodium ions in a layer of the glass at the surface by potassium ions while maintaining the temperature of the glass below the strain temperature thereof to place the surface in compression.

8. A method of tempering soda glass comprising the steps of replacing sodium ions in the glass at one surface to a depth twice that desired by potassium ions with a resultant shifting of the sodium ions throughout the glass and the excess sodium ions migrating out of the opposite surface of the glass, and then replacing sodium ions in the glass at the opposite surface by potassium ions with a resultant shifting of the sodium ions throughout the glass and the replacement of the innermost first applied potassium ions by sodium ions and the migration of the excess potassium ions out of the one surface of the glass.

9. A method of providing a strengthened, transparent alkali-metal containing glass article, fabricated from a single glass article, which comprises contacting the glass article at a temperature below the strain point of the glass with a source of exchangeable, relatively large, alkali-metal ions, and exchanging the relatively large alkali-metal ions of said source for relatively smaller alkali-metal ions of the glass surface until the glass surface layer has a greater molar volume in the unconstrained state than the molar volume of the interior base glass and is in compression.

10. A method of strengthening an alkali-metal containing glass comprising replacing the alkali-metal ions in a surface of the glass by larger alkali-metal ions by contacting the glass with a source of larger alkali-metal ions while retaining the glass below the strain temperature thereof until the surface is placed in compression by said replacement.

11. A glass article of improved strength containing ions of at least two alkali-metals of different size and having a surface compressive stress layer and an interior tensile stress layer, in which the glass of the surface layer has a greater molar volume in the unconstrained state than the glass of the interior layer, the concentration of the larger alkali-metal ion being greater in said surface layer than in said interior layer, and the concentration of the smaller alkali-metal ion being greater in said interior layer than in said surface layer, said differences in concentration creating said compressive stress.

12. An article as described in claim 11 in which the larger alkali-metal ion is potassium ion.

13. An article as described in claim 12 in which the replaced alkali-metal ion is sodium ion.

14. An article as described in claim 11 which has opposite surface layers in compression.

15. An article as described in claim 14 which is flat in form and which has its two opposite major surfaces in compression.

16. An article as described in claim 11 in which the depth of the surface compressive stress layer is greater than the depth of the deepest surface crack in the original article.

17. An article as described in claim 11 which is transparent.

18. An article as described in claim 11 in which the surface compressive stress layer has a peripheral portion of outwardly diminishing thickness to prevent undue boundary stressing and cracking of the glass.

19. The method of claim 10 in which opposite sides of the glass are placed in contact with said source and are thereby placed in compression.

20. The article of claim 11 wherein substantially the entire surface of one side of said glass is in compression.

References Cited by the Examiner
UNITED STATES PATENTS

| | | | |
|---|---|---|---|
| 2,055,181 | 9/1936 | Rostas | 316—7 |
| 2,075,446 | 3/1937 | Leibig | 65—31 |
| 2,779,136 | 1/1957 | Hood et al. | 117—118 |

DONALL H. SYLVESTER, *Primary Examiner.*